UNITED STATES PATENT OFFICE.

ROBERT E. SCHMIDT, OF ELBERFELD, GERMANY, ASSIGNOR TO THE FARBEN-FABRIKEN, VORMALS FR. BAYER & CO., OF SAME PLACE.

ALIZARINE DERIVATIVE.

SPECIFICATION forming part of Letters Patent No. 476,420, dated June 7, 1892.

Application filed November 19, 1891. Serial No. 412,426. (Specimens.)

*To all whom it may concern:*

Be it known that I, ROBERT E. SCHMIDT, doctor of philosophy, chemist, (assignor to the FARBENFABRIKEN, VORMALS FR. BAYER & Co., of Elberfeld,) a subject of the Emperor of Germany, residing at Elberfeld, Germany, have invented a new and useful Improvement in the Manufacture of a New Coloring-Matter Derived from Alizarine, of which I give in the following a clear and exact description.

My invention relates to the production of a new valuable alizarine dye-stuff by treating the alizarine bordeaux of my Letters Patent No. 446,893, dated February 24, 1891, with ammonia.

In carrying out my process practically I proceed as follows: About one hundred kilos of an alizarine Bordeaux paste, containing twenty per cent. of alizarine bordeaux, are thoroughly mixed with one thousand liters of water and five hundred kilos of ammonia liquid at twenty per cent. of ammonia and heated slowly to 80° centigrade on the water bath. The end of the reaction may be recognized when a test sample of the mixture, after having been poured into any acid and filtered off, dissolves in concentrated sulphuric acid with red color, and when the said test is repeated twice and the resulting liquid does not increase in intensity of color. The whole liquid is then mixed with about two thousand five hundred liters of water heated to boiling and decomposed by the addition of acids. The coloring-matter separates as a dark-violet precipitate and can easily be isolated by filtration.

My new alizarine dye-stuff thus obtained, which differs from alizarine bordeaux by containing nitrogen, forms a dark-violet precipitate with a greenish reflex. It is insoluble in water, easily soluble in soda-lye, with a bright-blue color. In concentrated sulphuric acid it dissolves with red color and cinnabar red fluorescence, and such sulphuric-acid solutions show in the spectroscopical research distinct bands of absorption. Out of its solutions in concentrated sulphuric acid it is precipitated by the addition of water in yellowish-brown flakes. It dyes wool mordanted with chromium salts a marine blue.

Having thus described my invention and in what manner it can be performed, that which I claim as new, and desire to secure by Letters Patent, is—

1. The process of producing a new alizarine dye-stuff by treating alizarine bordeaux with ammonia and subsequently precipitating the color with acids.

2. As a new product, the dye-stuff hereinbefore described, containing nitrogen, which forms a dark-violet crystalline precipitate with a greenish reflex, is insoluble in water, easily soluble in soda-lye, with a brightly-blue color, dissolving in concentrated sulphuric acid with red color and cinnabar-red fluorescence, sulphuric-acid solutions of which show distinct and clear bands of absorption in the spectroscope, and from its solutions in concentrated sulphuric acid it separates on the addition of water in yellowish-brown flakes, and which dyes wool mordanted with chromium salts a blue similar to that which is produced by alizarine blue.

In testimony whereof I have signed my name in the presence of two subscribing witnesses.

ROBERT E. SCHMIDT.

Witnesses:
RUDOLPH FRICKE,
WM. ESSENWEIN.